United States Patent
Liao et al.

(10) Patent No.: US 12,187,132 B2
(45) Date of Patent: Jan. 7, 2025

(54) ELECTRONIC GEAR-SHIFTING DEVICE OF AN ELECTRIC MOTORCYCLE FOR SIMULATING GEAR SHIFTING POWER OUTPUT

(71) Applicant: Kwang Yang Motor Co., Ltd., Kaohsiung (TW)

(72) Inventors: Wei-Xiang Liao, Kaohsiung (TW); Hao-Yu Wu, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 212 days.

(21) Appl. No.: 17/975,022

(22) Filed: Oct. 27, 2022

(65) Prior Publication Data

US 2023/0173929 A1 Jun. 8, 2023

(30) Foreign Application Priority Data

Dec. 8, 2021 (TW) ................. 110145934

(51) Int. Cl.
*B60L 15/20* (2006.01)
*B62K 23/02* (2006.01)
*B62K 23/08* (2006.01)

(52) U.S. Cl.
CPC .............. *B60L 15/20* (2013.01); *B62K 23/02* (2013.01); *B62K 23/08* (2013.01); *B60L 2240/486* (2013.01)

(58) Field of Classification Search
CPC .............. B60L 15/20; B60L 2240/486; B60L 2200/12; B60L 2260/50; B60L 15/2054; B62K 23/02; B62K 23/08; B62M 25/08; Y02T 10/72; F16H 61/0213; F16H 59/24
See application file for complete search history.

(56) References Cited

U.S. PATENT DOCUMENTS

2021/0206254 A1* 7/2021 Benedikt .................. B60K 6/36
2022/0063494 A1* 3/2022 Duo' ........................ B60L 7/18

FOREIGN PATENT DOCUMENTS

JP 4516485 B2 * 8/2010 ........... F16H 59/044

OTHER PUBLICATIONS

Consiglio, Design of a Vehicle Simulation Based Hardware in the Loop Testing System for Automotive Powertrains (Year: 2009).*

* cited by examiner

*Primary Examiner* — Elaine Gort
*Assistant Examiner* — Chanmin Park
(74) *Attorney, Agent, or Firm* — Birch, Stewart, Kolasch & Birch, LLP (57) ABSTRACT

The present invention is an electronic gear-shifting device of an electric motorcycle for simulating gear shifting power output, including an electronic shift unit, an electronic clutch unit and a throttle position sensor, and correspondingly outputting a shift signal, a clutch signal and a throttle position signal according to the operation of the rider. A vehicle controller receives the shift signal, the clutch signal and the throttle position signal to determine a target gear position of the electric motorcycle. The vehicle controller looks up a motor torque command according to the target gear position table and outputs the motor torque command to a motor controller, so that the motor controller controls an electric motor of electric motorcycle. Therefore, the electric motorcycle simulates the power performance of a general motorcycle without adding a physical clutch, a gearbox and other shifting mechanisms.

14 Claims, 10 Drawing Sheets

ELECTRONIC GEAR-SHIFTING DEVICE OF AN ELECTRIC MOTORCYCLE FOR SIMULATING GEAR SHIFTING POWER OUTPUT

CROSS REFERENCE TO RELATED APPLICATIONS

The present application claims priority to Taiwan application No. 110145934, filed on Dec. 8, 2021, the content of which is hereby incorporated by reference in its entirety.

BACKGROUND OF THE INVENTION

1. Field of the Invention

The present invention relates to an electric motorcycle, and particularly to an electronic simulate gear-shifting device applied to an electric motorcycle.

2. Description of the Related Art

The motive power source of a general electric motorcycle is mainly from an electric motor provided with the working power of the battery pack of the motorcycle. Adjusting the magnitude of the working power applied to the electric motor can directly change the speed of the electric motor to change the riding speed of the electric motorcycle. In order to provide better riding experience, an acceleration button (boost) is added to some electric motorcycles for the user to switch between "Acceleration Mode" and "Normal Mode". When the acceleration button is activated to enter the Acceleration Mode, the electric motorcycle has faster riding speed.

However, the electric motorcycles on the market are still very different from the traditional gear-shifting-type motorcycles. Because the model of the electric motorcycle developed by the general manufacturer does not have gear-shift mechanisms such as a clutch and a gearbox, the model of the electric motorcycle does not have a gear shifting function, and cannot provide different motor torque outputs in different gear positions.

SUMMARY OF THE INVENTION

Problem to be Solved in the Present Invention

In view of the general electric motorcycles lacking the gear-shifting function, the present invention provides an electronic gear-shifting device of an electric motorcycle for simulating gear shifting power output without adding gear-shift mechanisms such as a clutch, a gearbox, and so on, such that the electric motorcycle has an operation of shifting function.

Solution to the Problem

According to one preferred embodiment of the present invention, the electronic gear-shifting device of an electric motorcycle for simulating gear shifting power output includes:
an electronic shift unit outputting a shift signal;
an electronic clutch unit outputting a clutch signal;
a throttle position sensor outputting a throttle position signal;
a vehicle controller connected to the electronic shift unit, the electronic clutch unit, and the throttle position sensor; the vehicle controller determining the electric motorcycle is switched to a target gear position according to the shift signal, the clutch signal, and throttle position signal, and generating a motor torque command corresponding to the target gear position; and
a motor controller connected to the vehicle controller to receive the motor torque command, and controlling a power motor of the electric motorcycle according to the motor torque command.

According to another preferred embodiment of the present invention, the electronic gear-shifting device of an electric motorcycle for simulating gear shifting power output includes:
an electronic shift unit outputting a shift signal;
an electronic clutch unit outputting a clutch signal;
a throttle position sensor outputting a throttle position signal; and
a controller connected to the electronic shift unit, the electronic clutch unit, and the throttle position sensor; the controller determining the electric motorcycle is switched to a target gear position according to the shift signal, the clutch signal, and throttle position signal, and generating a motor torque command corresponding to the target gear position, and controlling a power motor of the electric motorcycle according to the motor torque command.

Technical Effect of the Present Invention

Under the condition that gear-shifting mechanisms such as a clutch, a gearbox, and so on are not additionally added, the present invention equips an electric motorcycle with an electronic shift unit and an electronic clutch unit for the rider to perform shifting operations. The electronic shift unit and the electronic clutch unit generate a shift signal and a clutch signal respectively, so that the electric motorcycle operates at a target gear position. By presetting the motor characteristic curves for different gear positions, the power motor of the electric motorcycle at the different gear positions generates different torque outputs according to the corresponding motor characteristic curves, so that the electric motorcycle simulates the function of the gear shifting operation of a common gear-shifting-type motorcycle.

DETAILED DESCRIPTION OF THE INVENTION

The present invention "electronic gear-shifting device of an electric motorcycle for simulating gear shifting power output" is applied to an electric motorcycle, such that the electric motorcycle has the simulating gear shift function like a gear-shifting-type motorcycle. The user can upshift, downshift, shift to neutral, etc., according to various riding needs, for example, to shift up and down in sequence between 1st gear↔neutral↔2nd gear↔3rd gear↔4th gear↔5th gear; or to cyclically shift between neutral↔1st gear↔2nd gear↔3rd gear↔4th gear↔5th gear. The number of gears and the way of cyclic change are formulated with reference to the operation mode of the current common motor motorcycle without special limitations. Referring to circuit block diagram shown in FIG. 1, the present invention includes an electronic shift unit 10, an electronic clutch unit 20, a throttle position sensor (TPS) 30, a vehicle controller 40, a motor controller 50, and a power motor 60.

Figure 2:
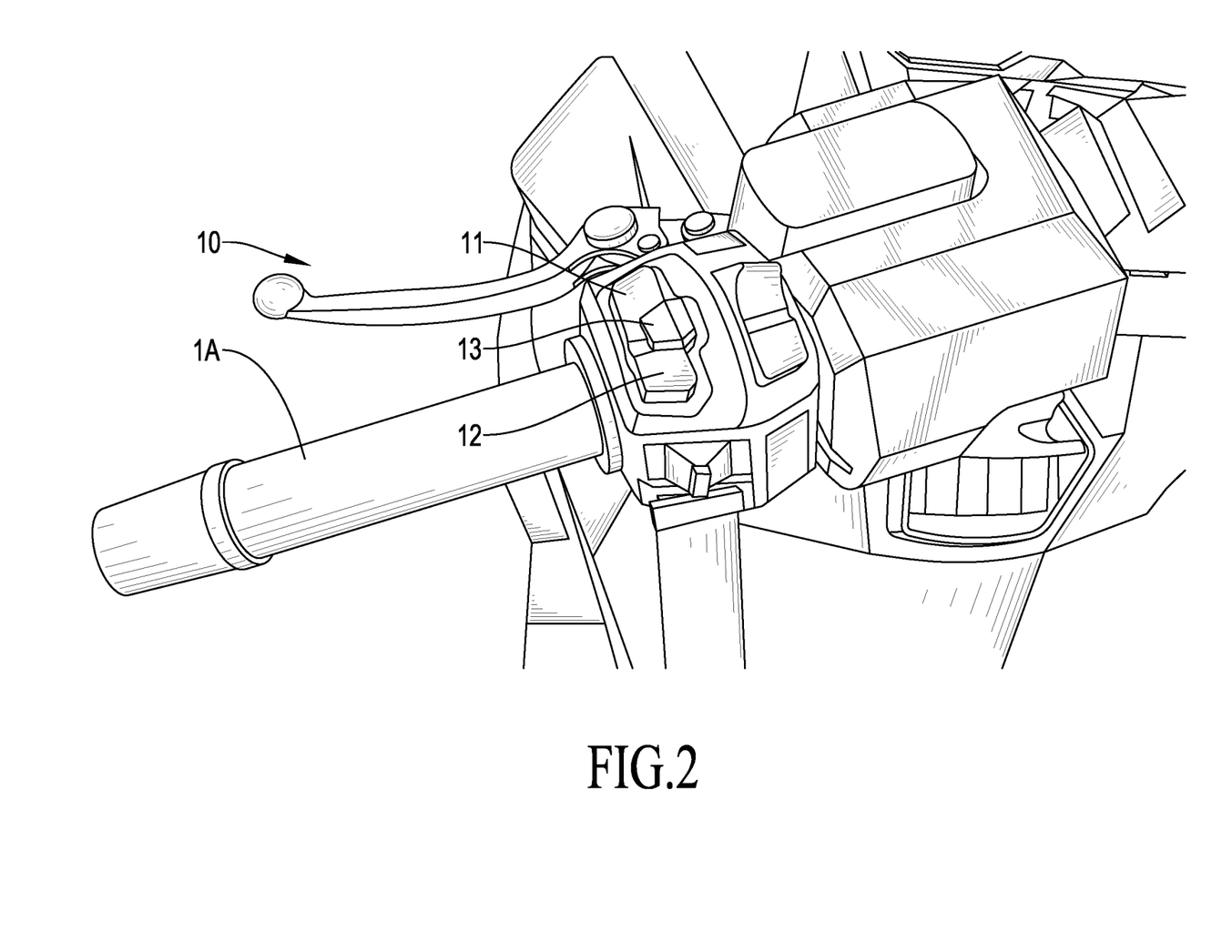
FIG. 2 is a schematic view of the first embodiment of the electronic shift unit of the present invention.
Figure 10:
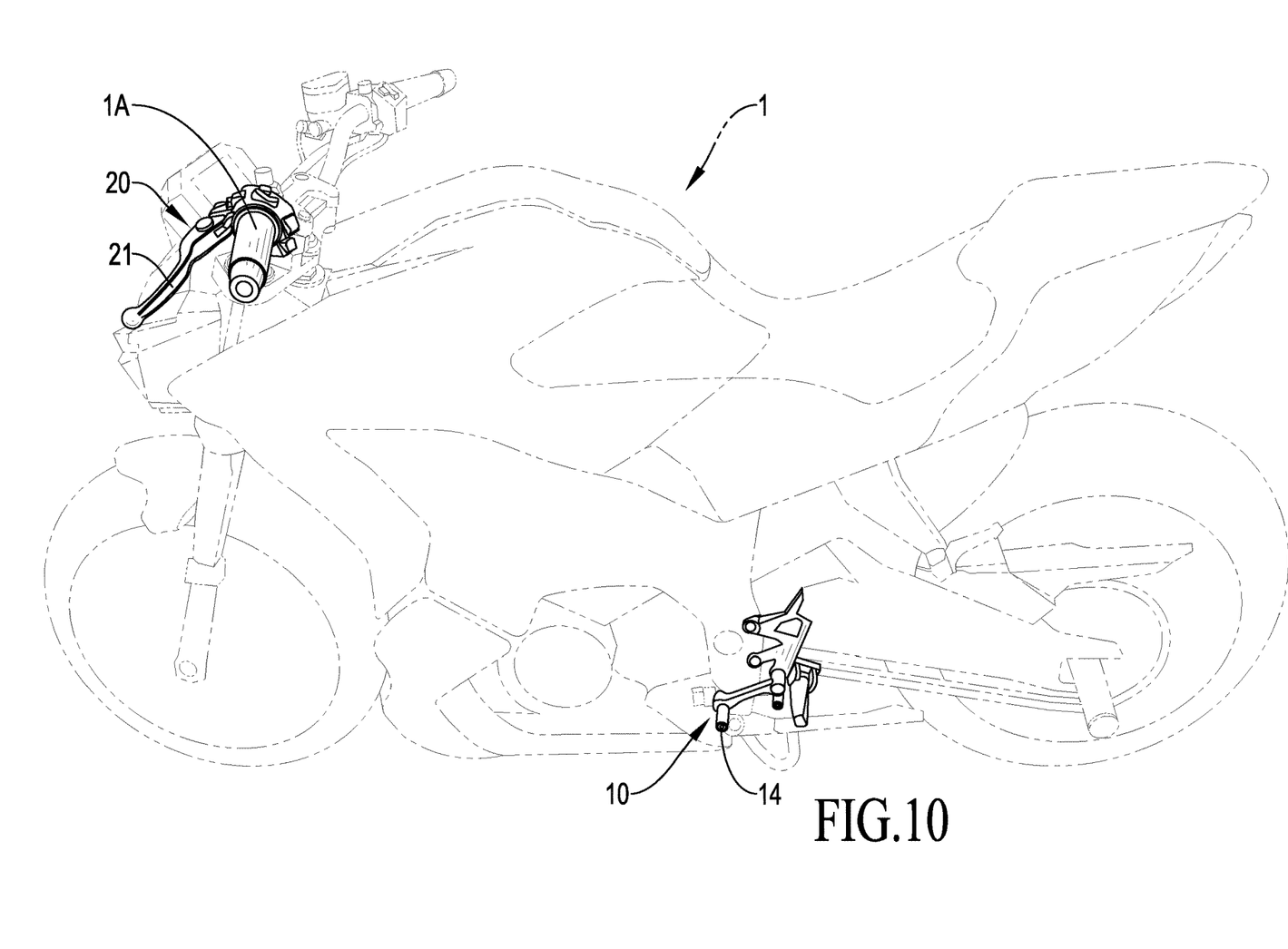
FIG. 10 is a schematic view of the electronic shift unit and the electronic clutch of the present invention mounted on a gear-shifting-type motorcycle.

Referring to FIG. 2, the electronic shift unit 10 is mounted on an electric motorcycle 1 (as shown in FIG. 10), for the user to operate to generate a shift signal S1. The shift signal S1 may be an upshift signal, a downshift signal, or a neutral signal. The first embodiment of the electronic shift unit 10 includes an upshift button 11, a downshift button 12, and a neutral button 13. The buttons can be mounted on the position of the electric motorcycle 1 that is convenient for the user to operate and press, for example, near one of the handles 1A of the electric motorcycle 1. When the upshift button 11, the downshift button 12, or the neutral button 13 is pressed and triggered by the user, correspondingly an upshift signal, a downshift signal, or a neutral signal is triggered.

Figure 3:
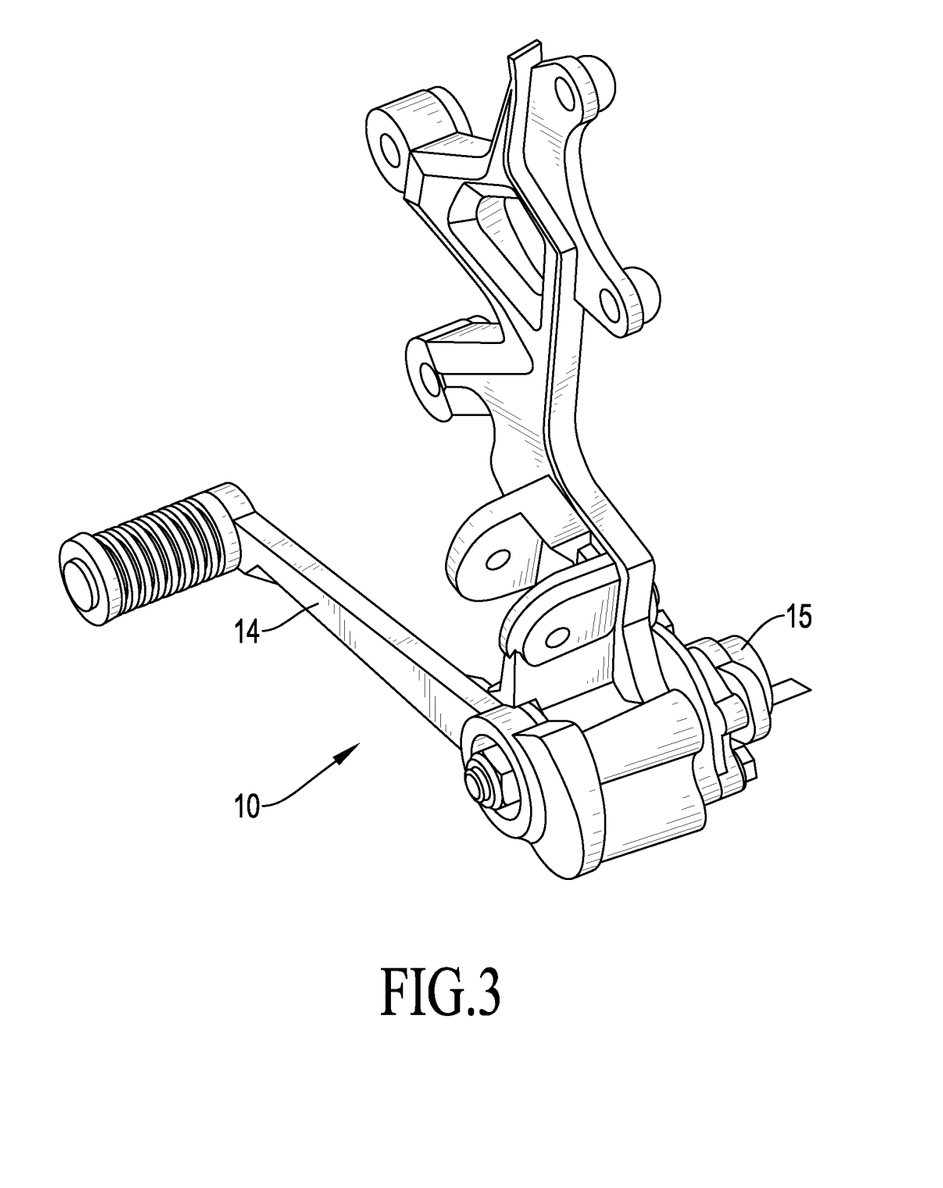
FIG. 3 is a schematic view of the second embodiment of the electronic shift unit of the present invention.

Referring to FIGS. 3 and 10, the second embodiment of the electronic shift unit 10 includes a gear shift pedal 14 and a gear shift pedal position sensor 15. The gear shift pedal 14 is for the user to step on and press. The working principle of the gear shift pedal position sensor 15 is similar to a multi-segment switch. As the user presses the gear shift pedal 14 each time, the state of contacts inside the gear shift pedal position sensor 15 is cyclically changed to output a shift signal S1. For example, when it is shifted up and down among 1st, N, 2nd, 3rd, 4th, and 5th gears, the shift signal S1 represents the target gear position to be shifted.

Figure 4:
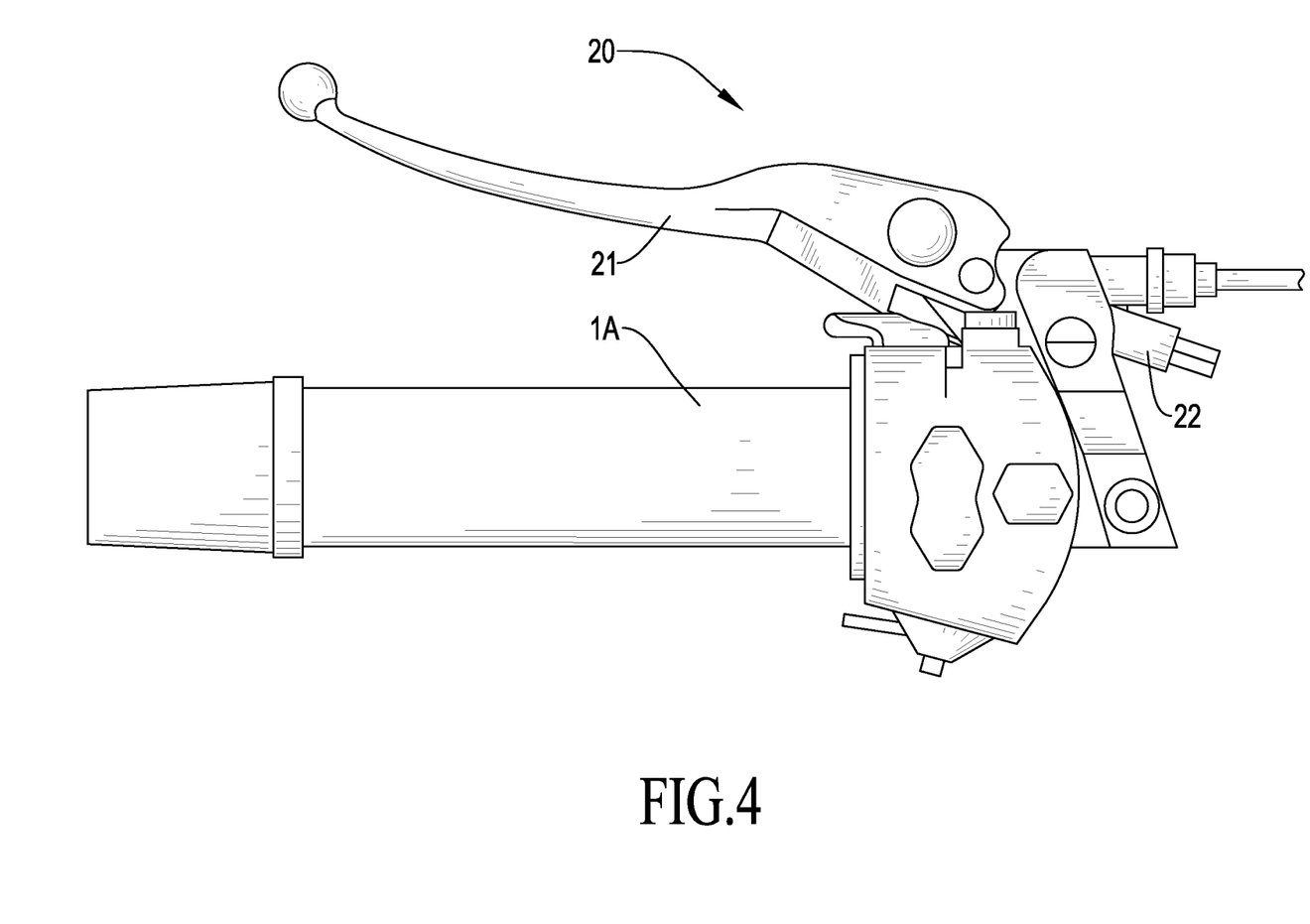
FIG. 4 is a schematic view of the electronic clutch unit of the present invention.

Referring to FIGS. 4 and 10, the electronic clutch unit 20 is mounted on the electric motorcycle 1, for the user to operate to generate a clutch signal S2. In a preferred embodiment, the electronic clutch unit 20 includes a clutch lever 21 and a micro switch 22. The clutch lever 21 is mounted near the handle 1A of the electric motorcycle 1 for the user to operate as hold and release. The micro switch 22 is connected to the clutch lever 21 and outputs a clutch signal S2 according to the state of the clutch lever 21. For example, when the clutch lever 21 is pulled, the micro switch 22 is triggered to output a high-level clutch signal S2; on the contrary, when the clutch lever 21 is not pulled, the micro switch 22 is not triggered, and does not output the clutch signal S2. In another preferred embodiment, the micro switch 22 in the electronic clutch unit 20 is replaced by a lever position sensor. The lever position sensor generates a clutch signal S2 of 0-5 volts according to the state of the clutch lever 21.

The throttle position sensor 30 detects the position of the throttle when the user operates the throttle at the moment, and generates a throttle position signal S3 accordingly to reflect the torque required by the user.

Figure 1:
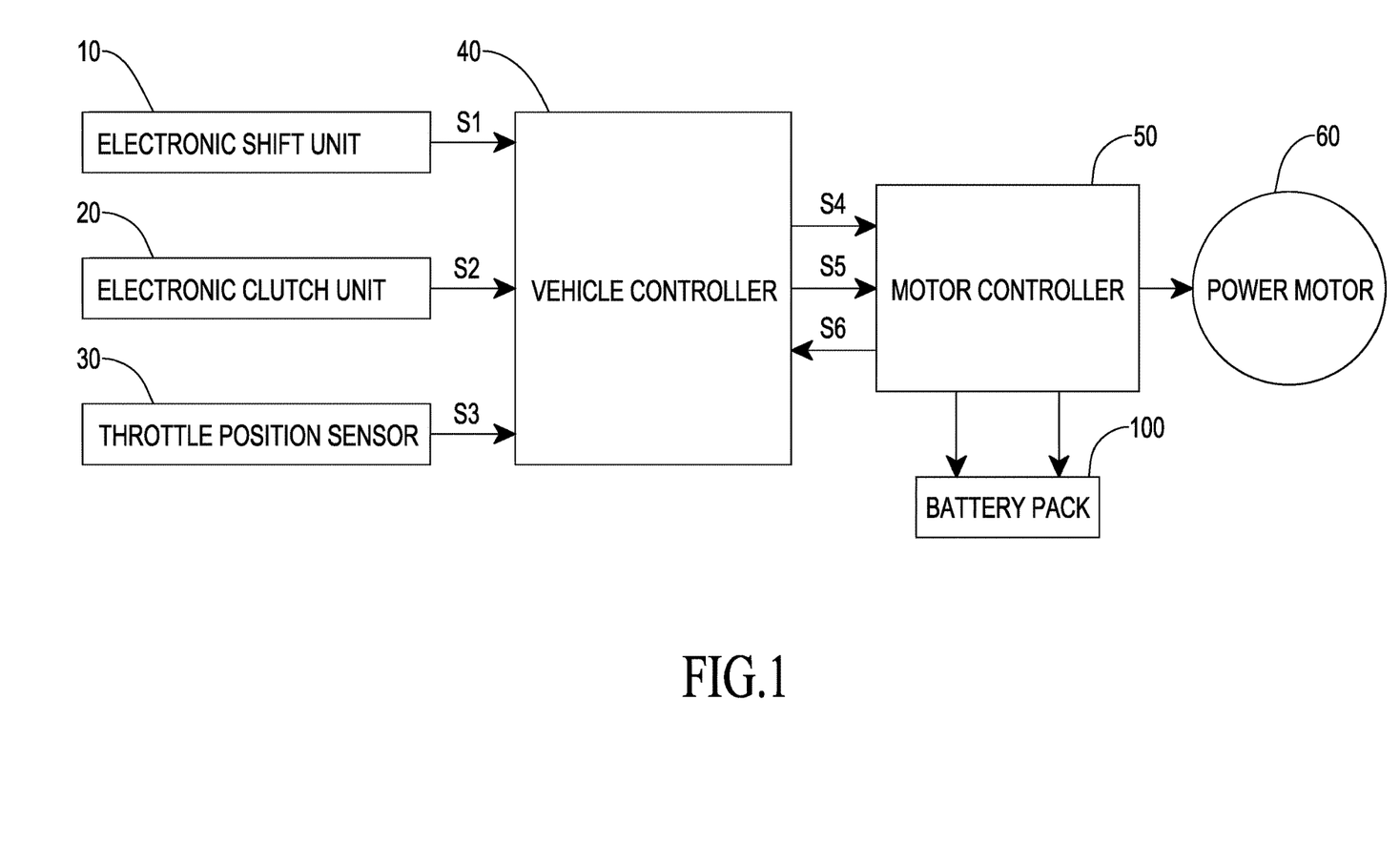
FIG. 1 is a circuit block diagram of the first embodiment of the electronic gear-shifting device of the present invention.

The vehicle controller 40 is connected to the electronic shift unit 10, the electronic clutch unit 20, and the throttle position sensor 30, receives the shift signal S1, the clutch signal S2, and the throttle position signal S3, and determines a target gear position to be shifted by the electric motorcycle 1 according to these signals. For example, the vehicle controller 40 receives the shift signal S1 and the clutch signal S2 within a preset time, which indicates that the rider performs a gear-shifting action to switch to a target gear position. After switching to the target gear position, the vehicle controller 40 generates a motor torque command S4 according to the target gear position. The generation method of the motor torque command S4 will be described in detail later. In addition to the motor torque command S4, in a preferred embodiment, the vehicle controller 40 outputs a recharging current command S5 according to the target gear position and the throttle position signal S3. The charging current command S5 is outputted to the motor controller 50. The motor controller 50 outputs a recharging current according to the recharging current command S5 to charge a battery pack 100 of the electric motorcycle 1.

The motor controller 50 is connected to the vehicle controller 40, receives the motor torque command S4 outputted by the vehicle controller 40, and drives the power motor 60 to rotate according to the motor torque command S4. A rotational speed sensor may be mounted on the power motor 60 for sensing the speed of the power motor 60 and providing the sensing result to the motor controller 50, so that the vehicle controller 40 obtains the current vehicle speed.

Figures 5A, 5B:
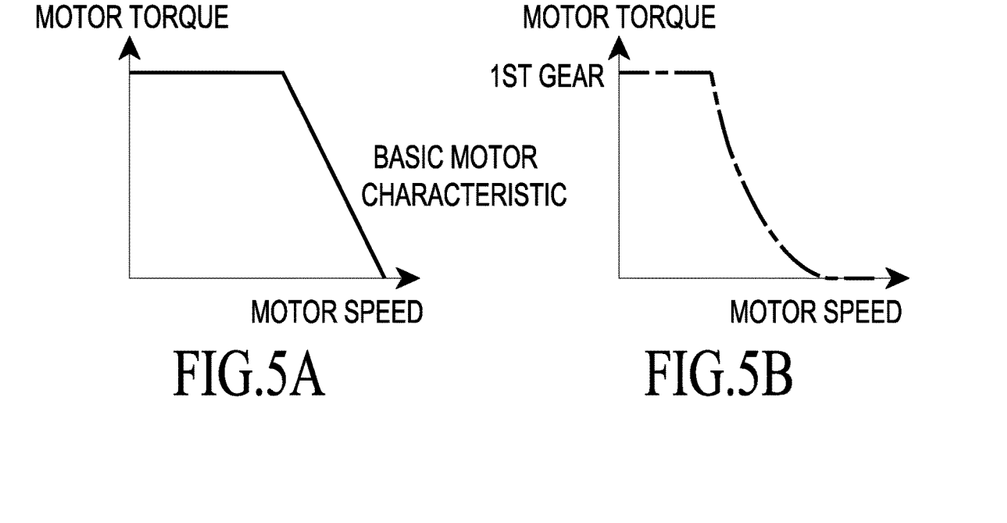
FIG. 5A is a curve schematic diagram of the basic relationship between the torque and the speed of the power motor.
FIGS. 5B to 5E are curve schematic diagrams of the relationships between the motor torque and the speed that are respectively preset according to different gear positions of the first embodiment of the present invention.
Figure 5C:
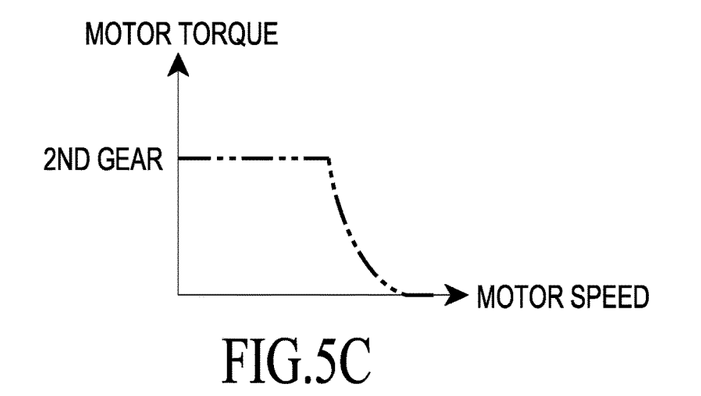
Figure 5D:
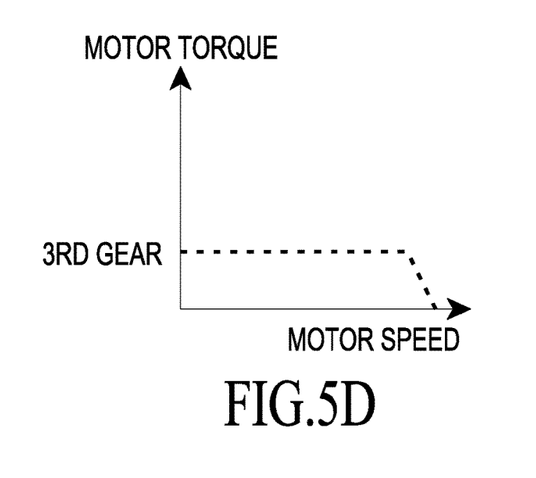
Figure 5E:
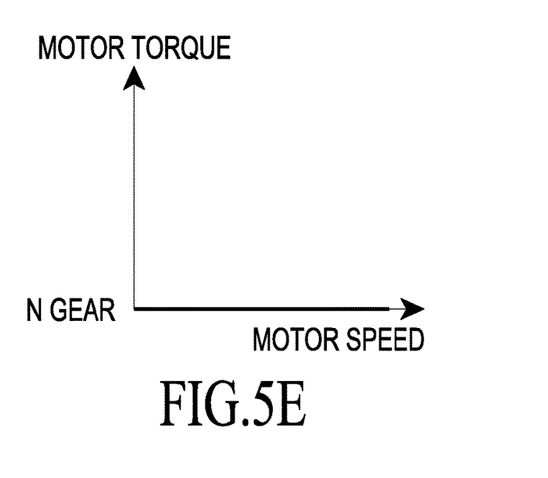

Regarding the generation method of the motor torque command S4, it is obtained by the computation of a built-in determination program by the vehicle controller 40. Referring to FIG. 5A, it is the basic relationship between the motor torque (vertical axis) and the motor speed (horizontal axis) of the power motor 60. The present invention regards the basic relationship as a reference basis to establish characteristic curves representing the relationship between the motor torque and the motor speed for different gear positions. FIGS. 5B to 5E show four different motor characteristic curves when the power motor 60 is in 1st gear, 2nd gear, 3rd gear and neutral (i.e., N gear). Wherein, the motor torque value in the N gear is always maintained at 0. In the low gear position (such as the 1st gear) at a low motor speed, the motor torque value is higher but the maximum motor speed is lower. In the high gear position (such as the 3rd gear) at a low motor speed, the motor torque value is lower but the maximum motor speed is higher. In this way, the power output of the gearbox in different gears is simulated, and the vehicle controller 40 uses the corresponding relationship curve by a lookup table searching according to the current gear of the electric motorcycle 1.

Figure 6:
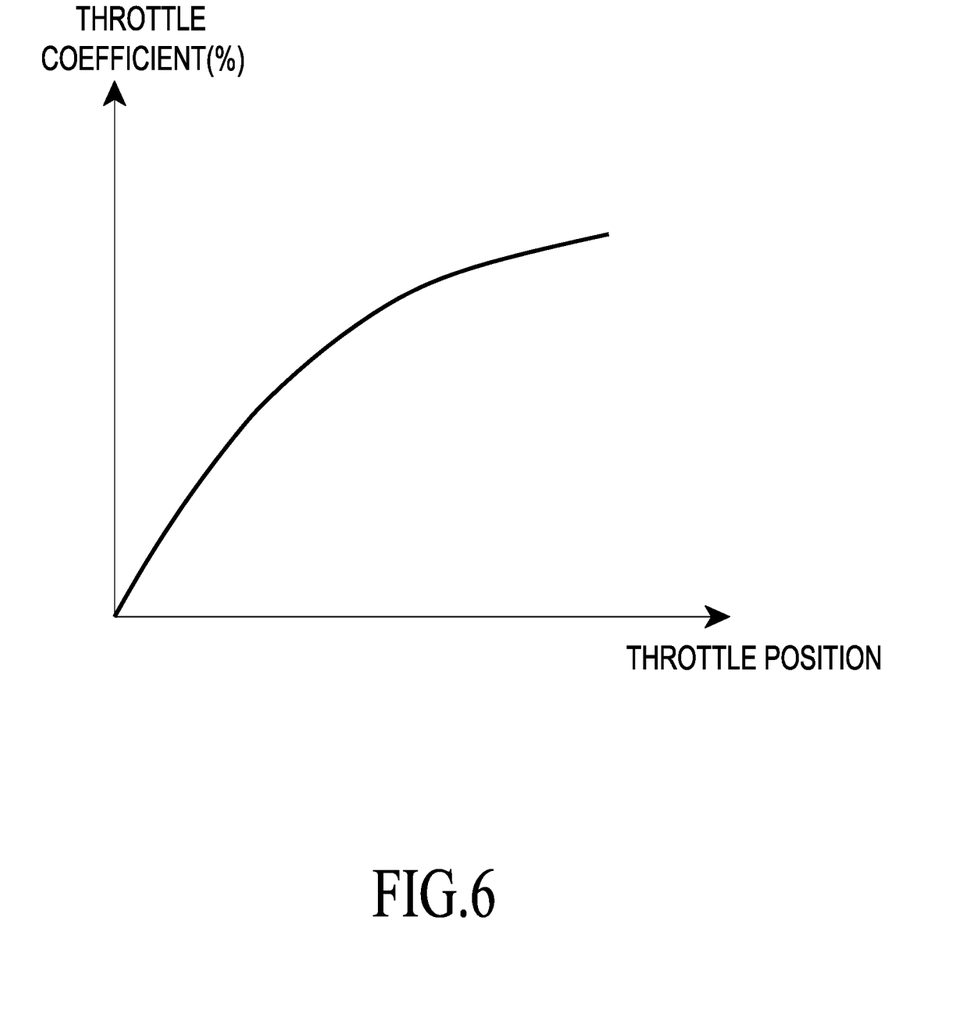
FIG. 6 is a curve schematic diagram of the relationship between the throttle coefficient and throttle position.

Referring to FIG. 6, the vehicle controller 40 has a built-in relative relationship between the throttle coefficient and the throttle position, searching for a corresponding throttle coefficient (%) according to the magnitude of the throttle position signal S3. The throttle coefficient is positively related to the throttle position. When the throttle position is larger, the throttle coefficient is also larger, representing the rider expects the power motor 60 to have a greater torque output when operating the throttle.

In an embodiment, the vehicle controller 40 sets the motor torque command S4 according to the product of the motor torque value and the throttle coefficient, and the calculation formula is as follows:

$$\text{Motor torque command} = \text{motor torque value} \times \text{throttle coefficient}$$

Wherein, the vehicle controller 40 selects the relationship curve of the corresponding gear from FIGS. 5B to 5E to obtain the motor torque value, and in conjunction to search the throttle coefficient (%) in FIG. 6, to calculate the motor torque command S4. For example, when the motor torque value is 80% and the throttle coefficient is 80%, the vehicle controller 40 calculates the motor torque command as 64%, and provides the motor torque command S4 to the motor controller 50.

Figure 7:
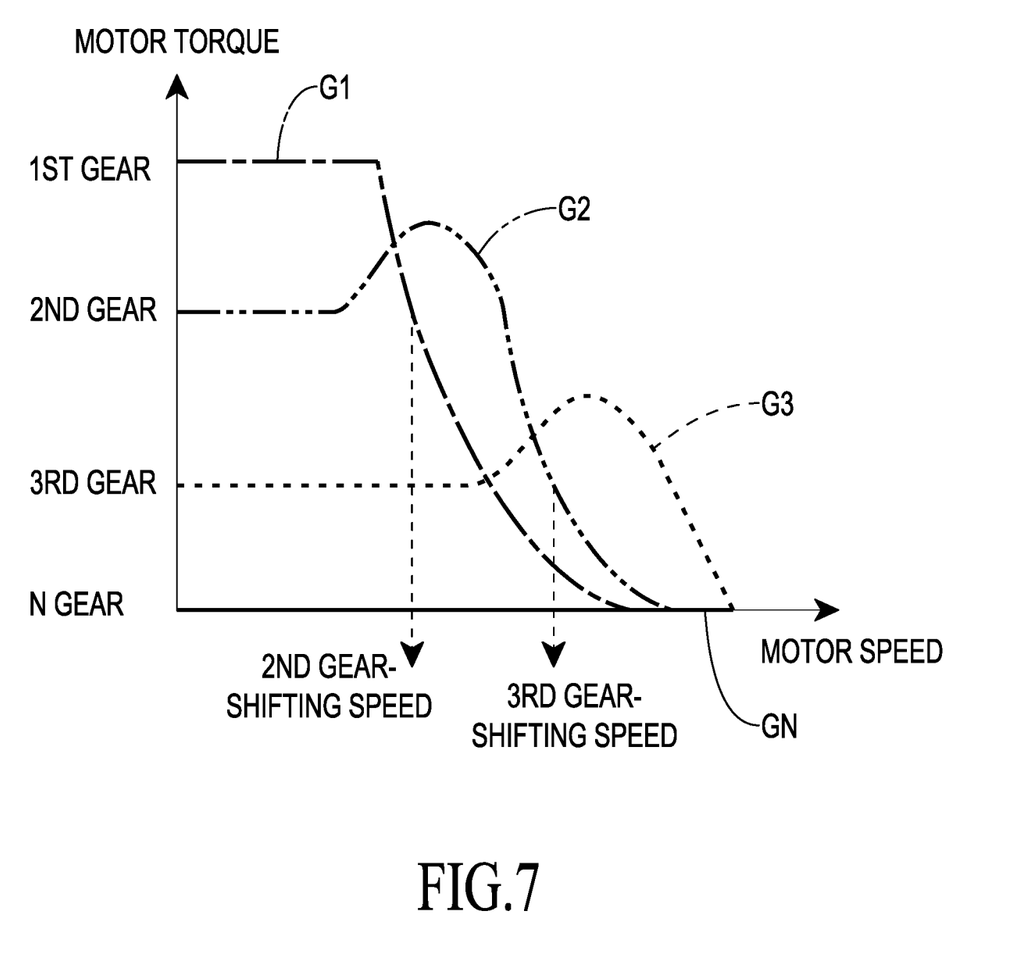
FIG. 7 is a curve schematic diagram of the relationship between the motor torque and the speed that is preset according to different gear positions of the second embodiment of the present invention.

Referring to FIG. 7, according to another preferred embodiment of the present invention, the relationship between the motor torque and the motor speed is adopted by the curve shown in the figure. The figure shows the relationship curves of four different gears: 1st gear, 2nd gear, 3rd gear, and neutral (i.e., N gear), which are represented by G1, G2, G3 and GN respectively. The difference between these curves and the aforementioned FIGS. 5B to 5E is that for other gear positions except the 1st gear and N gear (In this embodiment, the other gear positions are the 2nd gear and 3rd gear), the torque of these gear positions are increased in the gear-shifting speed period of these gears. The rider feels the power difference of the electric motorcycle during the shifting operation through the instantaneous change of the motive power. By increasing the torque of the gear position, the present invention increases the maximum power output of the gear position, enhances the acceleration feel when the gear is switched, and the speed does not drop too much on a hill climb in high gear position, so no immediate downshift is required.

The vehicle controller 40 can also perform different recharging current 8 planning according to different gear positions. Referring to the recharging current curve I1~I3 (corresponding to 1st to 3rd gear respectively) and IN (neutral) shown in FIG. 8, under the condition of the same motor speed, the present invention sets the relatively large recharging current for the low gear positions and the relatively small recharging current for the high gear positions. Therefore, when the vehicle controller 40 judges that the throttle is fully closed according to the throttle position signal S3 (i.e., the throttle position is 0%), the vehicle controller 40 selects a recharging current curve corresponding to the current gear position and sends a recharging current command S5 to the motor controller 50. The motor controller 50 outputs a recharging current to the battery pack 100 according to the recharging current command S5. Because the electric motorcycle 1 has a larger recharging current in low gear positions, the electric motorcycle 1 simulates the effect of the gearbox of the common gear-shifting-type motorcycle with a higher transmission braking effect in the low gear positions.

Figure 8:
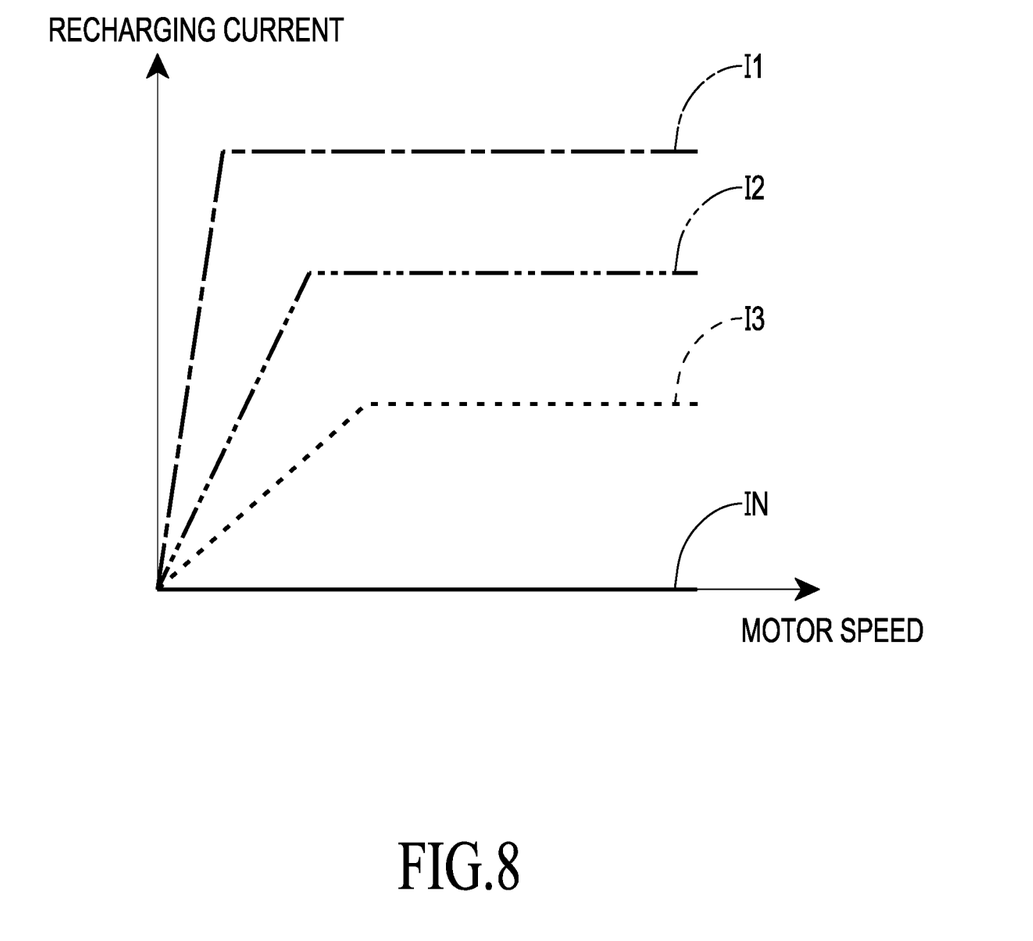
FIG. 8 is a curve schematic diagram of the relationship between the motor speed and the recharging current that is preset according to different gear positions of the present invention.

When the vehicle controller 40 determines that the current gear position is N or the electronic clutch unit 20 outputs the clutch signal S2 (i.e., the clutch lever 21 is pulled), the vehicle controller 40 not only controls the output of motor torque to be zero, but also outputs the recharging current command S5 to the motor controller 50 to control the motor controller 50 to output a zero or extremely low recharging current to the battery pack 100, thereby simulating the situation that only the rear wheels slide after the power of the common gear-shifting-type motorcycle is cut off.

Figure 9:
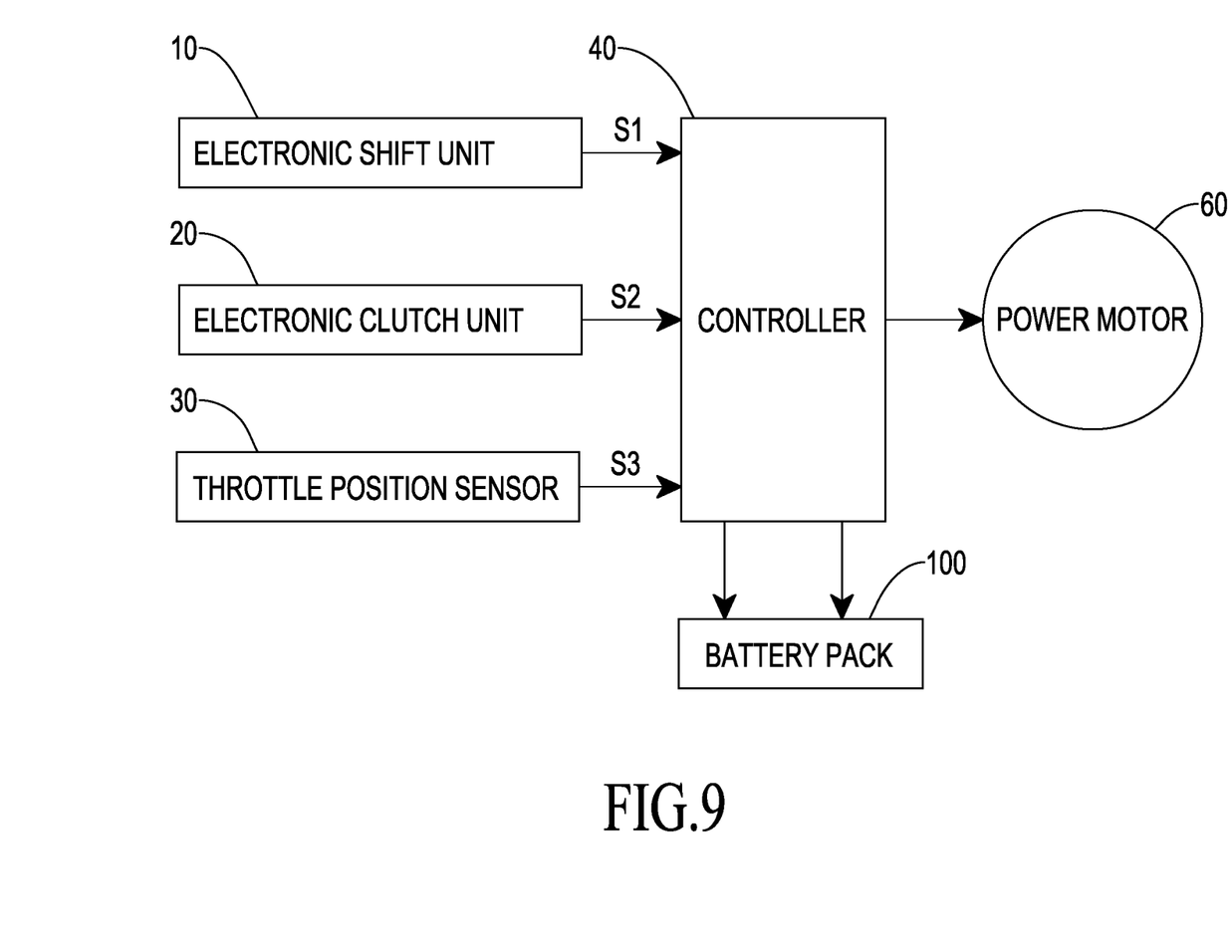
FIG. 9 is a circuit block diagram of the second embodiment of the electronic gear-shifting device of the present invention.

Referring to FIG. 9, it is a circuit block diagram of a second embodiment of an electronic gear-shifting device of an electric motorcycle for simulating gear shifting power output of the present invention. The difference from the first embodiment of FIG. 1 is that the vehicle controller 40 and the motor controller 50 are integrated into a single controller 70 that performs the functions of the vehicle controller 40 and the motor controller described above.

Under the condition that gear-shifting mechanisms such as a clutch, a gearbox, and so on are not additionally added, the present invention equips an electric motorcycle with an electronic shift unit and an electronic clutch unit for the rider to perform shifting operations and presets motor characteristic curves of different gear positions. Therefore, the power motor of the electric motorcycle generates different torque outputs according to the corresponding motor characteristic curve in different gear positions, and simulates the power output of the gear-shifting-type motorcycle when switching gears. The electric motorcycle also further adds additional torque output in the gear-shifting speed period to have better acceleration performance when gears are switched at an appropriate speed. In addition, the present invention plans different recharging currents for each different gear position, so that the low gear positions have higher recharging currents, simulating the function of a mechanical gearbox transmission brake. The present invention controls the motor to be in a low-current regenerative recharging mode in the neutral gear or the clutch is disengaged, thereby simulating the power cut off of the vehicle and the effect of sliding without resistance.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electronic gear-shifting device of an electric motorcycle for simulating gear shifting power output, including:
    an electronic shift unit outputting a shift signal;
    an electronic clutch unit outputting a clutch signal;
    a throttle position sensor outputting a throttle position signal;
    a vehicle controller connected to the electronic shift unit, the electronic clutch unit, and the throttle position sensor; the vehicle controller determining the electric motorcycle is switched to a target gear position according to the shift signal, the clutch signal, and the throttle position signal, and generating a motor torque command corresponding to the target gear position; and
    a motor controller connected to the vehicle controller to receive the motor torque command, and controlling a power motor of the electric motorcycle according to the motor torque command;
    wherein the vehicle controller is preset with recharging current curves corresponding to different gear positions, and the recharging current curves include a relationship between a recharging current and a motor speed, and the recharging current in a low gear position is greater than the recharging current in a high gear position;

when the vehicle controller determines that a throttle position of the electric motorcycle is fully closed according to the throttle position signal, outputting a recharging current command to the motor controller according to the recharging current curve corresponding to the gear position of the electric motorcycle, so that the motor controller outputs a recharging current to a battery pack.

2. The electronic gear-shifting device of an electric motorcycle for simulating gear shifting power output as claimed in claim 1, wherein the electronic shift unit includes an upshift button, a downshift button, and a neutral button mounted on the electric motorcycle; and the shift signal is generated when any one of the upshift button, the downshift button, and the neutral button is triggered.

3. The electronic gear-shifting device of an electric motorcycle for simulating gear shifting power output as claimed in claim 1, wherein the electronic shift unit includes a gear shift pedal and a gear shift pedal position sensor, and wherein the gear shift pedal position sensor is connected to the gear shift pedal.

4. The electronic gear-shifting device of an electric motorcycle for simulating gear shifting power output as claimed in claim 1, wherein the electronic clutch unit includes a clutch lever and a micro switch, and the micro switch outputs the clutch signal according to a state of the clutch lever.

5. The electronic gear-shifting device of an electric motorcycle for simulating gear shifting power output as claimed in claim 1, wherein the electronic clutch unit includes a clutch lever and a lever position sensor, and the lever position sensor outputs the clutch signal according to a state of the clutch lever.

6. The electronic gear-shifting device of an electric motorcycle for simulating gear shifting power output as claimed in claim 1, wherein the vehicle controller is preset with motor characteristic curves corresponding to different gear positions, and the motor characteristic curves include a relationship between a motor torque value and the motor speed; wherein the motor torque value corresponding to a neutral signal is zero, the motor torque value is higher and a maximum motor speed is lower when in the low gear position and at a low motor speed, and the motor torque value is lower and the maximum motor speed is higher when in the high gear position and at the low motor speed.

7. The electronic gear-shifting device of an electric motorcycle for simulating gear shifting power output as claimed in claim 1, wherein when the vehicle controller determines that the clutch signal is generated or the electric motorcycle is switched to neutral, the vehicle controller commands a power output of the power motor to be zero.

8. An electronic gear-shifting device of an electric motorcycle for simulating gear shifting power output, including:
an electronic shift unit outputting a shift signal;
an electronic clutch unit outputting a clutch signal;
a throttle position sensor outputting a throttle position signal; and
a controller connected to the electronic shift unit, the electronic clutch unit, and the throttle position sensor; the controller determining the electric motorcycle is switched to a target gear position according to the shift signal, the clutch signal, and the throttle position signal, and generating a motor torque command corresponding to the target gear position, and controlling a power motor of the electric motorcycle according to the motor torque command;

wherein the controller is preset with recharging current curves corresponding to different gear positions, and the recharging current curves include a relationship between a recharging current and a motor speed, and the recharging current in a low gear position is greater than the recharging current in a high gear position;

when the controller determines that a throttle position of the electric motorcycle is fully closed according to the throttle position signal, outputting a recharging current to a battery pack according to the recharging current curve corresponding to the gear position of the electric motorcycle.

9. The electronic gear-shifting device of an electric motorcycle for simulating gear shifting power output as claimed in claim 8, wherein the electronic shift unit includes an upshift button, a downshift button, and a neutral button mounted on the electric motorcycle; and the shift signal is generated when any one of the upshift button, the downshift button, and the neutral button is triggered.

10. The electronic gear-shifting device of an electric motorcycle for simulating gear shifting power output as claimed in claim 8, wherein the electronic shift unit includes a gear shift pedal and a gear shift pedal position sensor, and wherein the gear shift pedal position sensor is connected to the gear shift pedal.

11. The electronic gear-shifting device of an electric motorcycle for simulating gear shifting power output as claimed in claim 8, wherein the electronic clutch unit includes a clutch lever and a micro switch, and the micro switch outputs the clutch signal according to a state of the clutch lever.

12. The electronic gear-shifting device of an electric motorcycle for simulating gear shifting power output as claimed in claim 8, wherein the electronic clutch unit includes a clutch lever and a lever position sensor, and the lever position sensor outputs the clutch signal according to a state of the clutch lever.

13. The electronic gear-shifting device of an electric motorcycle for simulating gear shifting power output as claimed in claim 8, wherein the controller is preset with motor characteristic curves corresponding to different gear positions, and the motor characteristic curves include a relationship between a motor torque value and the motor speed; wherein the motor torque value corresponding to a neutral signal is zero, the motor torque value is higher and a maximum motor speed is lower when in the low gear position and at a low motor speed, and the motor torque value is lower and the maximum motor speed is higher when in the high gear position and at the low motor speed.

14. The electronic gear-shifting device of an electric motorcycle for simulating gear shifting power output as claimed in claim 8, wherein when the controller determines that the clutch signal is generated or the electric motorcycle is switched to neutral, the controller commands a power output of the power motor to be zero.

* * * * *